United States Patent
Oh et al.

(10) Patent No.: US 12,340,179 B2
(45) Date of Patent: Jun. 24, 2025

(54) CONVERSATION INTENTION REAL-TIME ANALYSIS METHOD

(71) Applicant: KOREA ADVANCED INSTITUTE OF SCIENCE AND TECHNOLOGY, Daejeon (KR)

(72) Inventors: Kyo Joong Oh, Daejeon (KR); Ho Jin Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 268 days.

(21) Appl. No.: 17/925,732

(22) PCT Filed: Jun. 25, 2020

(86) PCT No.: PCT/KR2020/008245
§ 371 (c)(1),
(2) Date: Nov. 16, 2022

(87) PCT Pub. No.: WO2021/261617
PCT Pub. Date: Dec. 30, 2021

(65) Prior Publication Data
US 2023/0351117 A1    Nov. 2, 2023

(51) Int. Cl.
*G06F 40/35*      (2020.01)
*G06F 16/3329*    (2025.01)
(Continued)

(52) U.S. Cl.
CPC .......... *G06F 40/35* (2020.01); *G06F 16/3329* (2019.01); *G06Q 10/0633* (2013.01)

(58) Field of Classification Search
CPC .... G06F 16/3329; G06F 16/335; G06F 40/30; G06F 40/35
(Continued)

(56) References Cited

U.S. PATENT DOCUMENTS 10,831,798 B2 * 11/2020 Christianson ....... G06F 16/3329
2010/0229112 A1 * 9/2010 Ergan .................. G06F 11/0769
                                                        715/764
(Continued)

FOREIGN PATENT DOCUMENTS

JP         2019-207647 A    12/2019
KR    10-2008-0005745 A     1/2008
(Continued)

OTHER PUBLICATIONS

PCT International Search Report for PCT Application No. PCT/KR2020/008245, dated Mar. 9, 2021.

*Primary Examiner* — Martin Lerner
(74) *Attorney, Agent, or Firm* — Schmeiser, Olsen & Watts LLP

(57) ABSTRACT

A conversation intention real-time analysis method is provided. A natural language conversation understanding unit determines conversation information regarding a response and a response policy depending on whether a refined sentence refined by a natural language conversation preprocessing unit for determining a question to be answered by analyzing a sentence. A conversation context is output and a response is extracted. A situation information collection unit collects situation information by standardizing a field situation, user information, business information, and domain information. A field-directed type response management unit detects a refined response according to situation information generated by the situation information collection unit from among the conversation information. A response providing unit transmits a final response to a portable device by detecting the final response from the refined response detected by the field-directed type response management unit.

12 Claims, 7 Drawing Sheets

(51) Int. Cl.
*G06F 16/335* (2019.01)
*G06Q 10/0633* (2023.01)

(58) Field of Classification Search
USPC .......................................... 704/1, 9, 257, 270
See application file for complete search history.

(56) References Cited

U.S. PATENT DOCUMENTS

| | | | | |
|---|---|---|---|---|
| 2016/0062980 | A1* | 3/2016 | Boguraev | G06N 5/04 |
| | | | | 706/11 |
| 2016/0132590 | A1* | 5/2016 | Byron | G06F 16/3344 |
| | | | | 707/722 |
| 2017/0154626 | A1* | 6/2017 | Kim | G10L 15/22 |
| 2018/0253432 | A1* | 9/2018 | Abu-Saba | G06F 16/3329 |
| 2020/0020331 | A1* | 1/2020 | Kim | G10L 15/30 |
| 2020/0075027 | A1* | 3/2020 | Arantes | G10L 15/22 |
| 2021/0141798 | A1* | 5/2021 | Steedman Henderson | |
| | | | | G06F 16/3344 |

FOREIGN PATENT DOCUMENTS

| | | |
|---|---|---|
| KR | 10-2015-0141279 A | 12/2015 |
| KR | 10-2019-0023316 A | 3/2019 |
| KR | 10-2019-0109614 A | 9/2019 |
| KR | 10-2019-0141870 A | 12/2019 |
| KR | 10-2020-0104544 A | 9/2020 |

\* cited by examiner

CONVERSATION INTENTION REAL-TIME ANALYSIS METHOD

CROSS-REFERENCE TO RELATED APPLICATIONS

This application claims priority to PCT Application No. PCT/KR2020/008245, having a filing date of Jun. 25, 2020, the entire contents of which are hereby incorporated by reference.

FIELD OF TECHNOLOGY

The following relates to a conversation intention real-time analysis method, and more particularly, to a method of analyzing intention of a conversation in real time in which an artificial intelligence assistant for supporting a field job collects a user profile and job-related information and provides assistance for a job procedure to a field expert through a conversation and situation information.

BACKGROUND

In various application domains such as voice recognition personal assistants, artificial intelligence speakers, chatbots, autonomous vehicles, etc., the technology of human-machine communication through dialogue is being implemented through various application cases.

Using such a conversational interface, it is possible to improve the accessibility and usability of services or provide situational information or a personalized service. In particular, it can respond to simple questions from field experts or execute an instruction for assisting a job, which may increase job efficiency and provide a guide for procedural field knowledge, and it may be used for on-site training. In this way, an artificial intelligence assistant requires a high-level natural language processing and understanding technology because queries and instructions are input through natural language conversations rather than simple input of instructions.

Existing chatbots or artificial intelligence assistants for field experts manage conversations by converting a natural language or voice input into a sentence that can be analyzed by a computer, analyzing an input query using natural language processing and understanding technology, asking about missing information, and finding an answer to provide responses to inputs through the process of providing optimal answers to users in the form of text or voice.

The background technology of embodiments of the present invention are disclosed in "Device for estimating and responding to intention of customer's consultation and computer-readable medium" Korean Patent Publication No. 10-2015-0141279 (Dec. 18, 2015).

Conventional conversation systems and chatbot technologies analyze queries and provide responses by focusing only on the content of conversations. Accordingly, to answer a query in an end-to-end manner, conventional conversation systems and chatbot technologies focus on the analysis of natural language characteristics of queries such as keywords, morpheme patterns, dependency information, etc. However, the latest chatbot technology requires a deep understanding to respond to various expressions and short speech through analysis of implied meanings and the intentions of queries. For example, a chatbot for customer consultation or product marketing quickly finds the intention of a conversation from some main keywords included in conversational sentences with a current customer and performs a related procedural action. Examples in the financial domain may include giving a short answer to a query about whether a loan is delayable or repayable in an end-to-end manner, solving a joining or update request through a corresponding scenario, quickly connecting a leaving customer to a professional agent, etc.

However, assistants for field experts should collect missing information by inducing a conversation and provide information or responses appropriate for the current situation of a user rather than answering an end-to-end query. In addition, it is necessary to find the progress of a job performed by a current user using the user's past service use record or current state.

Conventional situation-aware services collect data for finding a state of a user from various sensors or a middle platform and refine the collected data into situation information. Since conventional technologies are for the purpose of automation and intelligence in the execution of machines or devices, tasks to be performed in a specific state or condition are defined. Artificial intelligence assistants obtain additional information required for a response through a conversation with a user. Accordingly, a procedure for standardizing information required for a response and asking a user a question to obtain corresponding information or asking the same question again is necessary.

Embodiments of the present invention are directed to providing a method in which an artificial intelligence assistant for supporting a field job collects a user profile and job-related information and provides assistance for a job procedure to a field expert through a conversation and situation information.

SUMMARY

An aspect relates to a method of analyzing intention of a conversation in real time, the method including: analyzing, by a natural language conversation understanding unit, a refined sentence output by a natural language conversation preprocessing unit for analyzing a sentence and determining a question to be answered, extracting conversation information depending on which one of a general conversation, a short-answer conversation, and a procedural conversation the refined sentence corresponds to, and determining a response policy; analyzing, by an assistant conversation management unit, the conversation information and the response policy provided or input by the natural language conversation understanding unit, outputting conversation context, and extracting response candidates related to a query of the conversation information; standardizing, by a situation information collection unit, a field situation through the response candidates extracted by the assistant conversation management unit, user information, job information, and domain information to collect situation information; detecting, by a field-oriented response management unit, refined responses in accordance with the situation information generated by the situation information collection unit from among the conversation information extracted by the natural language conversation understanding unit; and detecting, by a response providing unit, a final response from the refined responses detected by the field-oriented response management unit and transmitting the final response to a portable device.

The extracting of the conversation information for a response or the determining of the response policy may include analyzing whether the query is related to a job or an application domain using a conversation sentence refined by the natural language conversation preprocessing unit as an input and determining whether to respond in accordance with the application domain and an application system, selecting a response policy for a short-answer conversation when the query of an input conversation in the conversation sentence refined by the natural language conversation preprocessing unit is a query responded to with a short answer, and selecting a response policy for a conversation related to procedural knowledge when the input conversation or the query in the conversation sentence refined by the natural language conversation preprocessing unit is a conversation related to procedural knowledge.

The procedural knowledge may include conditions and rules of actions that a user abides by when performing a duty.

The outputting of the conversation context and the extracting of the response candidates related to the query of the conversation information may include: analyzing conversation context in the conversation information input from the natural language conversation understanding unit; when the conversation information input from the natural language conversation understanding unit is a general query, detecting response candidates for the general query; when the conversation information input from the natural language conversation understanding unit is a short-answer conversation, detecting response candidates for the short-answer conversation on the basis of predefined queries or repeated queries; and determining whether the conversation information input from the natural language conversation understanding unit is a conversation related to procedural knowledge, and when the conversation information is a conversation related to the procedural knowledge, detecting response candidates for the conversation related to the procedural knowledge in accordance with a condition and an order.

The detecting of the response candidate for the short-answer conversation may include, when the conversation information input from the natural language conversation understanding unit is a short-answer conversation, analyzing similarities with the query sentence in query-answer pairs prepared in advance and determining a response to a query having a highest score in existing response knowledge as a response candidate.

The detecting of the response candidates for the conversation related to the procedural knowledge comprises: when the procedural knowledge relates to a method, detecting knowledge about conditions preceding a job; when the procedural knowledge relates to an order, detecting knowledge about an order of performing the job; when the procedural knowledge is for training or before the job is started, detecting basic guideline knowledge; and while the job is performed, standardizing knowledge for providing checklist knowledge.

The standardizing of the field situation for the collection of the situation information may include recognizing a job of a user using the user information and the job information and domain knowledge, generating a table template in which situation information input from a situation-aware platform is standardized in accordance with the job of the user, and recognizing which procedural knowledge corresponds to a procedural situation using the conversation context input from the assistant conversation management unit, the situation information, and the job information.

The table template may include a model for estimating and recognizing a current stage of the situation and situation information analyzed by the model.

The detecting of the refined responses may include extracting response candidate qualifications to map the response candidates input from the assistant conversation management unit to the situation information input from the situation information collection unit, recognizing a current order or state in procedural knowledge by considering job-related metainformation and situation information and context information together and generating a response-situation mapping result table by mapping the response candidates to the situation information, and detecting refined responses among the response candidates on the basis of response situation mapping results of the response situation mapping result table.

The detecting of the refined responses may include scoring the response candidates to detect the refined responses.

The detecting of the refined responses may include setting a higher score for a corresponding response when a current situation is mapped to a larger number of columns, and scoring the response candidates by giving a degree of importance to each column of the response-situation mapping result table.

The detecting and transmitting of the final response to the portable device may include selecting a response having a highest score among the refined responses as the final response.

In a method of analyzing intention of a conversation in real time according to an aspect of embodiments of the present invention, an artificial intelligence assistant for supporting a field job can collect a user profile and job-related information and provide assistance for a job procedure to a field expert through a conversation and situation information.

With a method of analyzing intention of a conversation in real time according to another aspect of embodiments of the present invention, it is possible to provide specialized knowledge for performing a field job or information, such as a guideline, a checklist, etc., to which a field expert should pay attention.

A method of analyzing intention of a conversation in real time according to another aspect of embodiments of the present invention can increase efficiency of a field job and provide a guide for procedural field knowledge or can be used for on-site training.

BRIEF DESCRIPTION

Some of the embodiments will be described in detail, with reference to the following figures, wherein like designations denote like members, wherein.

DETAILED DESCRIPTION

Figure 1:
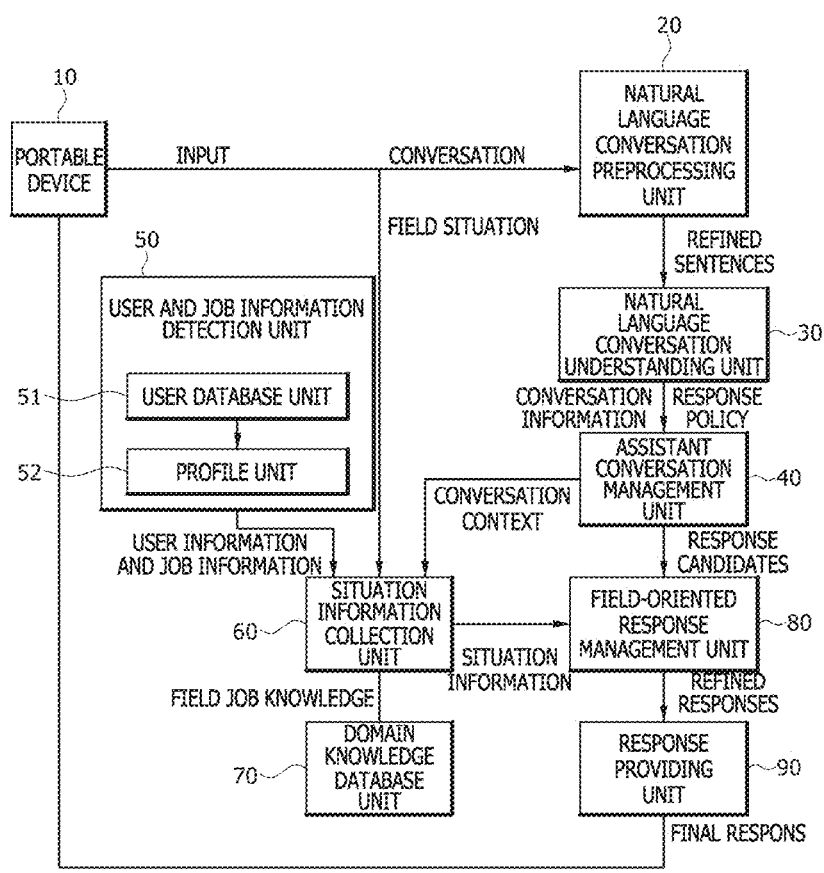
FIG. 1 is a block diagram of a device for analyzing intention of a conversation in real time according to an embodiment of the present invention.

Hereinafter, a method of analyzing intention of a conversation in real time according to embodiments of the present invention will be described in detail with reference to the accompanying drawings. In this process, the thicknesses of lines, the sizes of components, etc. shown in the drawings may be exaggerated for the clarity and convenience of description. Further, terms described below are terms defined in consideration of the functions in embodiments of the present invention and may be changed depending on the intention of a user or operator or a precedent. Therefore, the terms should be defined on the basis of the overall content of the specification.

Description of the specification may be implemented in, for example, a method or a process, a device, a software program, a data stream, or a signal. Even when only discussed in the context of a single form of implementation (e.g., discussed only as a method), discussed features may also be implemented in other forms (e.g., a device or a program). A device may be implemented as appropriate hardware, software, firmware, etc. The method may be implemented in a device, such as a processor or the like, which is generally a processing device including, for example, a computer, a microprocessor, an integrated circuit, or a programmable logic device. Processors also include a communication device, such as a computer, a cellular phone, a portable personal digital assistant (PDA), a smart speaker device, a wearable device, and other devices, which facilitates information communication between end users.

A device for analyzing intention of a conversation in real time according to an embodiment of the present invention is appropriate for a user who provides a service in which many queries are raised in relation to a job such as a field expert working in a field, a call center operator, or a marketer.

A field expert may use an artificial intelligence assistant to raise a query related to a field job, check a guideline, manage a checklist to be gone through, or automatically report results of performing a job and may also use the artificial intelligence assistant in memorization, simple calculation, etc.

Therefore, basic information about a user, situation information, and the content of input conversations are required to determine what kind of job the user performs and what information is necessary. Information on a user may include profile information of the user, information on an ongoing job, past service use, view of information and records, etc.

A field situation may include data that may be obtained from a mobile platform or a sensor device when the mobile platform or the sensor device is present, and the like.

FIG. 1 is a block diagram of a device for analyzing intention of a conversation in real time according to an embodiment of the present invention.

Referring to FIG. 1, the device for analyzing intention of a conversation in real time according to the embodiment of the present invention includes a portable device 10, a natural language conversation preprocessing unit 20, a natural language conversation understanding unit 30, an assistant conversation management unit 40, a user and job information detection unit 50, a situation information collection unit 60, a domain knowledge database unit 70, a field-oriented response management unit 80, and a response providing unit 90.

The portable device 10 is carried by a user, such as a field expert, a call center operator, or a product marketer, to perform a job, and a mobile platform, a sensor device, etc. may be employed.

The portable device 10 receives voice for a conversation or information on a field situation and outputs a final response through the response providing unit 90.

The natural language conversation preprocessing unit 20 recognizes the boundary of a sentence spanning several turns or divides a query sentence into simple sentences to determine a question to be answered.

In general, conversational system technologies mainly provide a response in each turn in an end-to-end response manner. However, in a conversation under a normal situation, one sentence may be spoken over several turns, or several sentences may be input in the form of a complex sentence in one turn. Accordingly, the natural language conversation preprocessing unit 20 preprocesses such a conversation spanning several turns to recognize the boundary of a sentence spanning several turns or splitting a query sentence into simple sentences and determines what question to answer. Also, the natural language conversation preprocessing unit 20 corrects typographic errors and spacing errors in sentences to improve the performance of a subsequent natural language processing and recognition task and analyzes morphemes of conversational sentences as well as refined sentences.

The natural language conversation understanding unit 30 analyzes refined sentences obtained through a preprocessing process by the natural language conversation preprocessing unit 20 and outputs conversation information and a response policy.

The assistant conversation management unit 40 analyzes the conversation information and the response policy input from the natural language conversation understanding unit 30 to output conversation context and extracts response candidates related to a query of the conversation information.

The user and job information detection unit 50 detects user information and job information and includes a user database unit 51 and a profile unit 52.

The user database unit 51 stores personal information of the user.

The profile unit 52 detects a field job including job-related experience, career information, skill, etc. of the user using the personal information of the user stored in the user database unit 51.

The domain knowledge database unit 70 stores domain knowledge.

To manage a current procedural conversation, the situation information collection unit 60 standardizes a field situation using the conversation context input from the assistant conversation management unit 40, the user information and job information input from the user and job information detection unit 50, and domain knowledge and outputs situation information.

The field-oriented response management unit 80 detects refined responses that are suitable for the field situation among the response candidates extracted by the assistant conversation management unit 40.

The response providing unit 90 selects a final response from among the refined responses detected by the field-oriented response management unit 80 and transmits the final response to the portable device 10.

A method of analyzing intention of a conversation in real time according to an embodiment of the present invention will be described in detail with reference to FIGS. 2 to 7.

Figure 2:
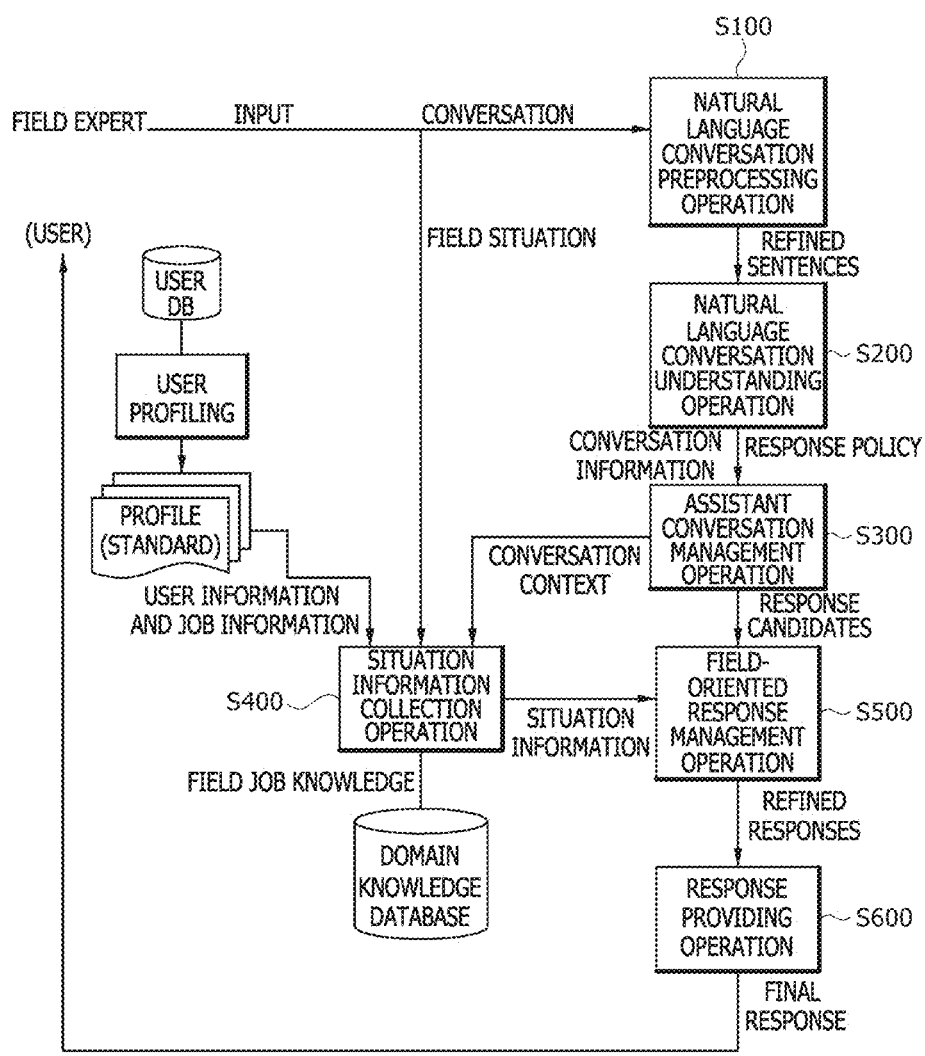
FIG. 2 is a flowchart of a method of analyzing intention of a conversation in real time according to an embodiment of the present invention.
Figure 3:
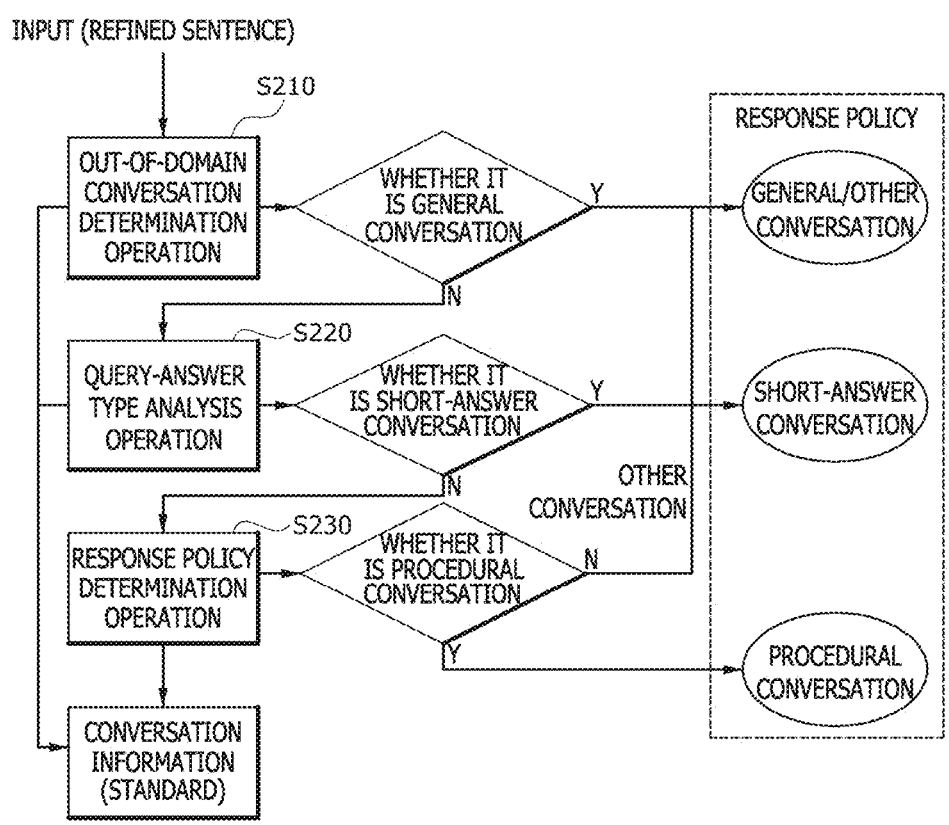
FIG. 3 is a flowchart illustrating an operating process of a natural language conversation understanding unit according to an embodiment of the present invention.
Figure 4:
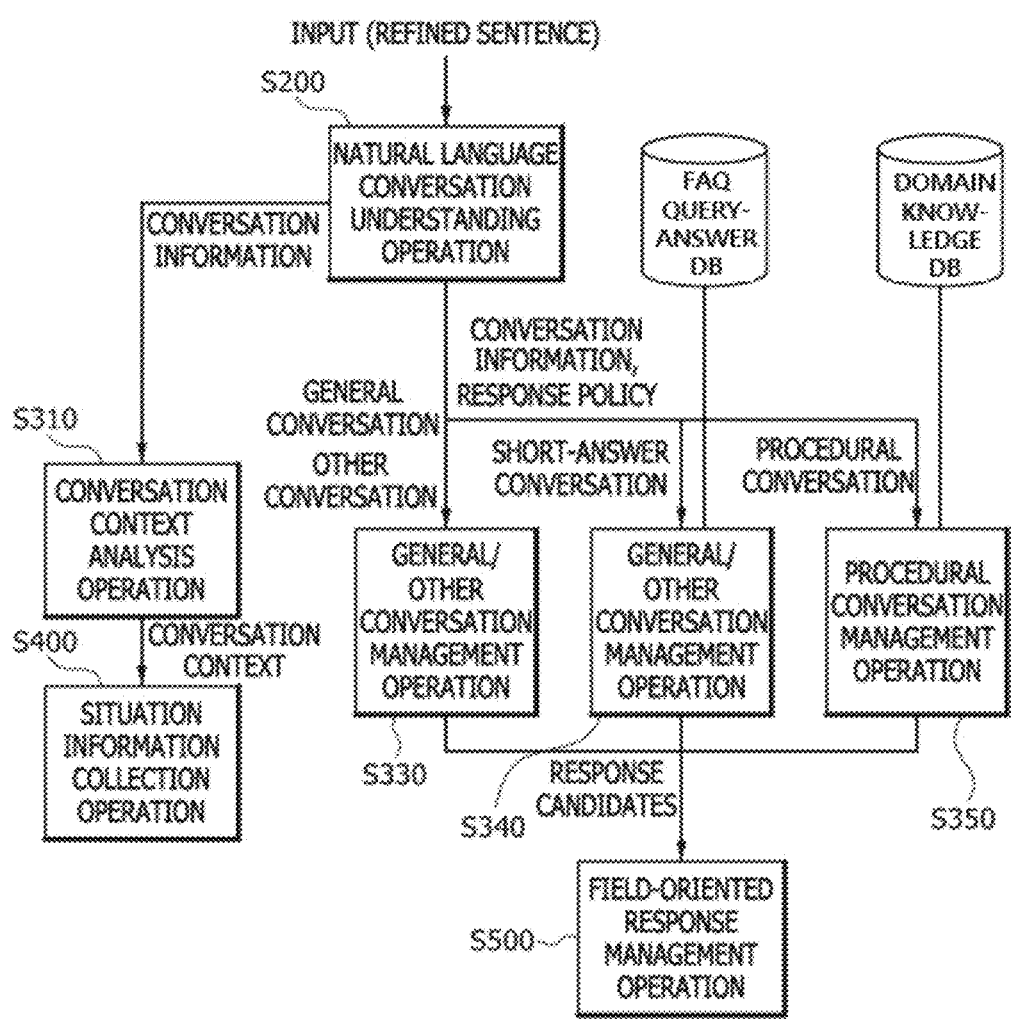
FIG. 4 is a flowchart illustrating an operating process of an assistant conversation management unit according to an embodiment of the present invention.
Figure 5:
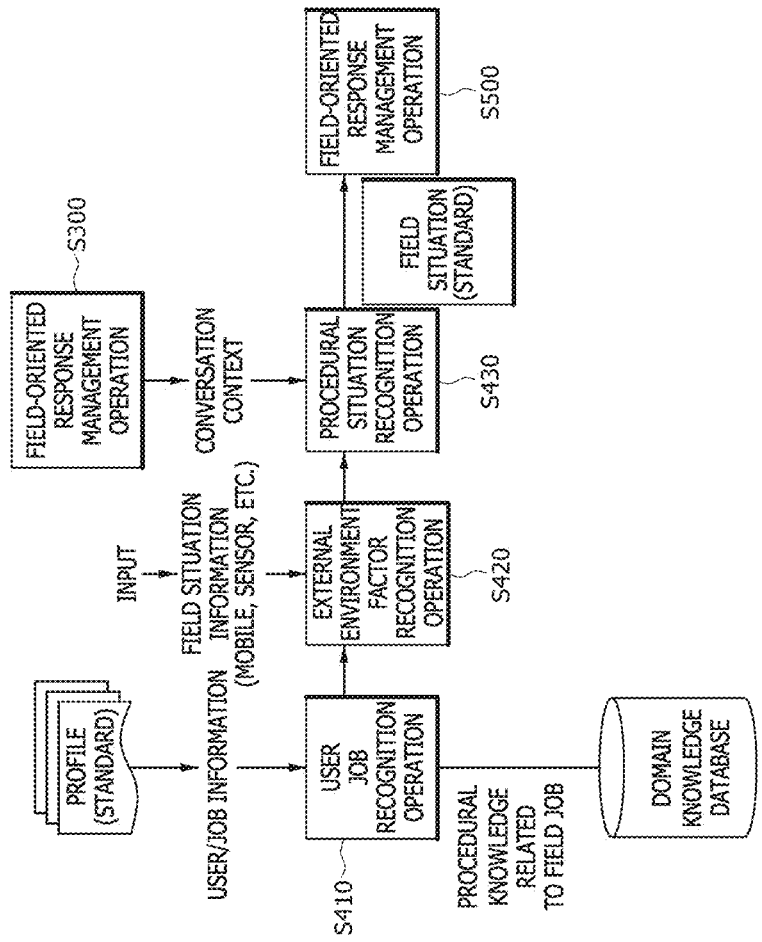
FIG. 5 is a flowchart illustrating an operating process of a situation information collection unit according to an embodiment of the present invention.
Figure 6:
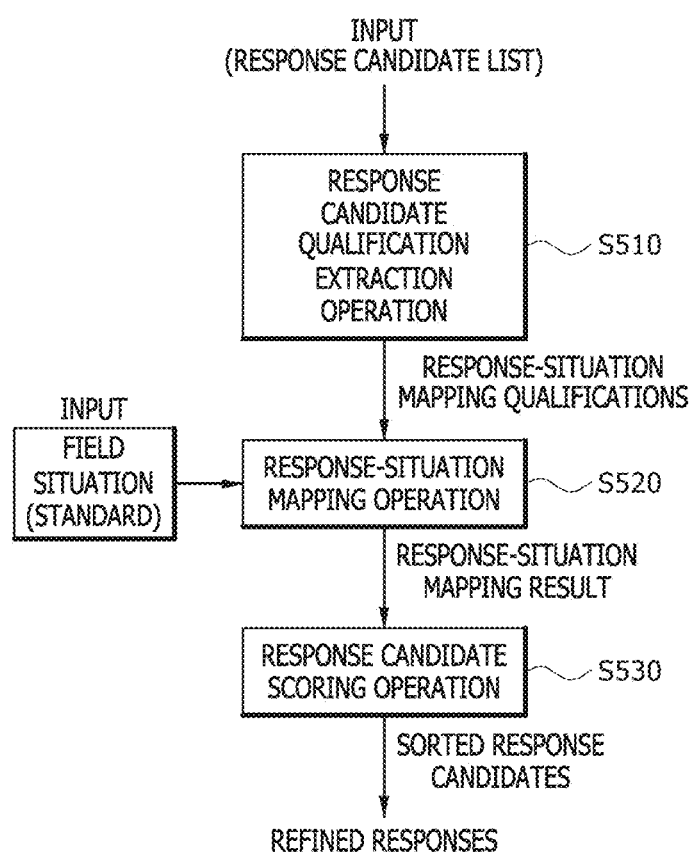
FIG. 6 is a flowchart illustrating an operating process of a field-oriented response management unit according to an embodiment of the present invention.
Figure 7:
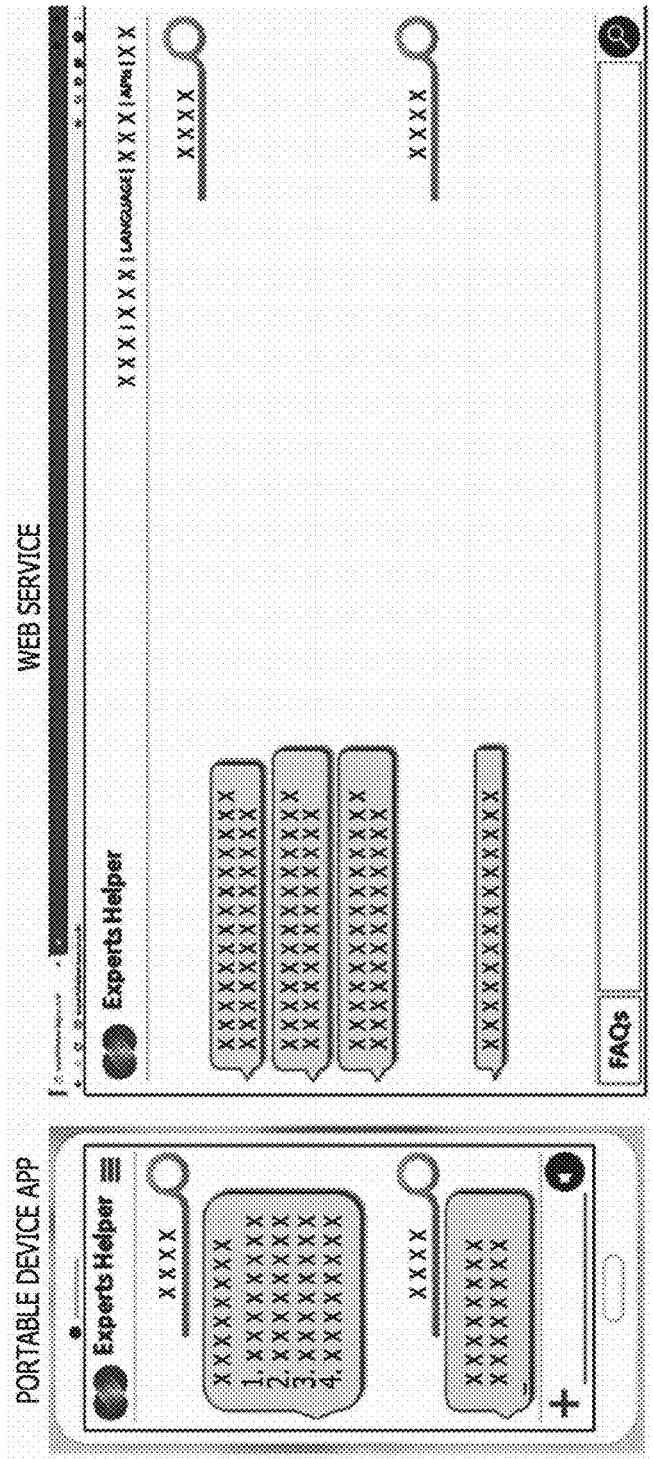
FIG. 7 is a diagram illustrating an interface design of a portable device according to an embodiment of the present invention.

FIG. 2 is a flowchart of a method of analyzing intention of a conversation in real time according to an embodiment of the present invention. FIG. 3 is a flowchart illustrating an operating process of a natural language conversation understanding unit according to an embodiment of the present invention. FIG. 4 is a flowchart illustrating an operating process of an assistant conversation management unit according to an embodiment of the present invention. FIG. 5 is a flowchart illustrating an operating process of a situation information collection unit according to an embodiment of the present invention. FIG. 6 is a flowchart illustrating an operating process of a field-oriented response management unit according to an embodiment of the present invention. FIG. 7 is a diagram illustrating an interface design of a portable device according to an embodiment of the present invention.

First, referring to FIGS. 2 to 6, the natural language conversation preprocessing unit 20 performs a natural language conversation preprocessing operation S100 of recognizing the boundary of a sentence spanning several turns or splitting a query sentence into simple sentences to determine what question to answer. In other words, in a conversation under a normal situation, one sentence may be spoken over several turns, or several sentences may be input in the form of a complex sentence in one turn. Accordingly, the natural language conversation preprocessing unit 20 preprocesses such a conversation spanning several turns to recognize the boundary of a sentence spanning several turns or split a query sentence into simple sentences and determines what question to answer. Also, the natural language conversation preprocessing unit 20 corrects typographic errors and spacing errors in sentences and analyzes morphemes of conversational sentences as well as refined sentences.

Referring to FIG. 3, the natural language conversation understanding unit 30 performs a natural language conversation understanding operation S200 of analyzing the refined sentences output by the natural language conversation preprocessing unit 20 through a preprocessing process and outputting conversation information and a response policy. The natural language conversation understanding operation S200 includes an out-of-domain conversation determination operation S210, a query-answer type analysis operation S220, and a response policy determination operation S230.

First, in the out-of-domain conversation operation S210, the natural language conversation understanding unit 30 receives a conversation sentence refined by the natural language conversation preprocessing unit 20 and determines whether to respond in accordance with an application domain and an application system by analyzing whether a corresponding query is related to a job or the application domain. In the case of a general conversation query, the natural language conversation understanding unit 30 responds only when there is an answering rule. In the case of other conversations, the natural language conversation understanding unit 30 does not respond.

In the query-answer type analysis operation S220, the natural language conversation understanding unit 30 selects a short-answer response policy when the query of the received conversation may be responded to with a short answer. As for the query, it may be determined whether there is query-answer knowledge predefined by a domain expert or frequently asked question (FAQ) knowledge or whether there is a question corresponding or similar to the query among existing query-answer cases, and the history of answers may be provided as a response.

In the response policy determination operation S230, the natural language conversation understanding unit 30 determines whether the corresponding conversation or query is a conversation related to procedural knowledge. When the corresponding conversation or query is a conversation related to procedural knowledge, the natural language conversation understanding unit 30 selects a response policy related to procedural knowledge. Here, the procedural knowledge indicates conditions and rules of actions that a user should abide by when performing his or her duties. A field job mainly corresponds to procedural knowledge and includes the order, guidelines, checklists, etc. of the corresponding job.

Referring to FIG. 4, the assistant conversation management unit 40 performs an assistant conversation management operation S300 depicted in FIG. 2 of analyzing the conversation information and the response policy input from the natural language conversation understanding unit 30, outputting conversation context, and extracting response candidates related to a query of the conversation information. The assistant conversation management operation S300 includes a conversation context analysis operation S310, a general other conversation management operation S320, a short-answer conversation management operation S340 and a procedural conversation management operation S350.

First, in the conversation context analysis operation S310, the assistant conversation management unit 40 analyzes conversation context in the conversation information input from the natural language conversation understanding unit 30, which is basically performed by filling a conversation context analysis table in accordance with the application domain and the application system. The conversation context analysis table includes questions refined into simple sentences and domains of the questions, speech act classification and analysis information, responses exchanged in previous conversations, whether the user has been satisfied, etc.

In the general other conversation management operation S320, the assistant conversation management unit 40 detects response candidates to only respond to general queries in accordance with the predetermined response policy. General other conversations mainly correspond to greetings, job assistant instructions (schedule management, notifications, memoranda, etc.), talking to oneself, swearing, etc.

In the short-answer conversation management operation S340, when the conversation information is short-answer conversation, the assistant conversation management unit 40 detects response candidates for a predefined query or a frequently repeated query through a FAQ query-answer database. In this case, the assistant conversation management unit 40 analyzes similarities with the query sentence in query-answer pairs prepared in advance and determines a response to a query having the highest score in existing response knowledge as a candidate sentence, that is, a response candidate.

In the procedural conversation management operation S350, the assistant conversation management unit 40 searches domain knowledge and detects which procedural knowledge the conversation is related to using methods such as query analysis, knowledge inference, etc. For example, in the case of procedural knowledge about a method, the assistant conversation management unit 40 detects knowledge about conditions preceding the job. In the case of procedural knowledge about an order, the assistant conversation management unit 40 detects knowledge about the order of performing the job. When the procedural knowledge is for training or before the job is started, the assistant conversation management unit 40 detects basic guideline knowledge. While the job is performed, the assistant conversation management unit 40 standardizes the corresponding knowledge into a template and detects the corresponding knowledge to provide checklist knowledge. In the case of a procedural conversation, the assistant conversation management unit 40 obtains knowledge including all conditions, orders, etc. and thus detects a plurality of response sentences, that is, response candidates, in accordance with the conditions and orders.

Referring to FIG. 5, to manage a current procedural conversation, the situation information collection unit 60 performs a situation information collection operation S400 of standardizing a field situation using the conversation context input from the assistant conversation management unit 40, the user information and the job information input from the user and job information detection unit 50, and the domain knowledge and outputting situation information. The situation information collection operation S400 includes a user job recognition operation S410, an external environment factor recognition operation S420, and a procedural situation recognition operation S430.

In the user job recognition operation S410, the situation information collection unit 60 obtains job-related information, such as personal information, the existing history of queries, etc., from the profile unit 52 and finds the job of the user such as the user's job-related experience, career information, skill, what field job the user mainly performs, etc. In this way, it is possible to detect what kind of job is currently being performed by the user, which job classification the job falls into, whether there is a similar job case, etc.

In the external environment factor recognition operation S420, the situation information collection unit 60 generates a standardized situation information table using data input from a situation-aware platform, such as a mobile device, a sensor, etc., that is, field situation information. In this case, the situation information collection unit 60 defines a table template in accordance with the job of the user obtained in the user job recognition operation S410 to provide the table template and inputs a model for estimating and recognizing a current stage of the situation, situation information analyzed by the model, etc. to the table template.

In the procedural situation recognition operation S430, the situation information collection unit 60 recognizes which procedural knowledge corresponds to the current situation of the user on the basis of field situation information and conversation context information of the table template. In this case, the situation information collection unit 60 determines which procedural knowledge corresponds to the current situation of the user by considering the field situation information and conversation context information together with the extracted job information and situation information, and missing information is asked for again to determine the current situation or state. For example, in the case of a pole transformer management job, an exterior inspection and an installation state inspection in the checklist of the corresponding job are performed, and while inspection checklist items (points to focus on) are presented, an answer, such as yes or no, is input by the user.

Referring to FIG. 6, the field-oriented response management unit 80 performs a field-oriented response management operation S500 of detecting a refined response suitable for the field situation among the response candidates extracted in the assistant conversation management operation. The field-oriented response management operation S500 includes a response candidate qualification extraction operation S510, a response-situation mapping operation S520, and a response candidate scoring operation S530.

First, in the response candidate qualification extraction operation S510, the field-oriented response management unit 80 extracts response candidate qualifications by comparing the response candidates and generates a table mainly with whether a main keyword or entity name has been performed or checked to map the response candidate sentences input from the assistant conversation management unit 40 to corresponding situation information input from the situation information collection unit 60.

In the response-situation mapping operation S520, the field-oriented response management unit 80 recognizes a current order or state in procedural knowledge by considering job-related metainformation and situation information and context information together. The field-oriented response management unit 80 recognizes the current order or state in procedural knowledge by considering the job-related metainformation and situation information and the context information together and generates a response-situation mapping result table by mapping the response candidates to the situation information. Here, the field-oriented response management unit 80 may receive blank content in the response-situation mapping result table by asking the user for the blank content, fill the table with synonyms or vocabulary of superordinate or subordinate concepts, and determines whether the procedure has been completed.

The field-oriented response management unit 80 scores the responses on the basis of the response-situation mapping results of the response-situation mapping operation S520. Basically, the field-oriented response management unit 80 sets a higher score for a corresponding response when the current situation is mapped to a larger number of columns, and scores the responses by giving the degree of importance to each column of the response-situation mapping result table. Subsequently, the field-oriented response management unit 80 sorts the responses in descending order and provides the responses as refined responses.

The response providing unit 90 selects a response having the highest score among the refined responses provided by the field-oriented response management unit 80 as a final response and transmits the final response to the portable device 10.

Accordingly, the portable device 10 outputs the final response as shown in FIG. 7.

Meanwhile, the method of analyzing intention of a conversation in real time according to an embodiment of the present invention may be provided in the form of a program to the portable device (a smartphone or tablet) 10 as shown in FIG. 7 or installed on another platform capable of Internet communication through a web or application programming interfaces (APIs).

As described above, in the method of analyzing intention of a conversation in real time according to an embodiment of the present invention, an artificial intelligence assistant for supporting a field job can collect a user profile and job-related information and provide assistance for a job procedure to a field expert through a conversation and situation information.

With the method of analyzing intention of a conversation in real time according to an embodiment of the present invention, it is possible to provide specialized knowledge for performing a field job or information, such as a guideline, a checklist, etc., to which a field expert should pay attention.

The method of analyzing intention of a conversation in real time according to an embodiment of the present invention can increase efficiency of a field job and provide a guide for procedural field knowledge or can be used for on-site training.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A conversation intention real-time analysis method, the method comprising:
    analyzing, by a natural language conversation understanding unit, a refined sentence output by a natural language conversation preprocessing unit for analyzing a sentence and determining a question to be answered, extracting conversation information for a response depending on which one of a general conversation, a short-answer conversation, and a procedural conversation the refined sentence corresponds to, and determining a response policy;
    determining, by an assistant conversation management unit, the conversation information and the response policy provided by the natural language conversation understanding unit, outputting conversation context, and extracting response candidates related to a query of the conversation information;
    standardizing, by a situation information collection unit, a field situation through the response candidates extracted by the assistant conversation management unit, user information, job information, and domain information to collect situation information;
    detecting, by a field-oriented response management unit, refined responses in accordance with the situation information generated by the situation information collection unit from among the conversation information extracted by the natural language conversation understanding unit; and
    detecting, by a response providing unit, a final response from the refined responses detected by the field-oriented response management unit and transmitting the final response to a portable device.

2. The method of claim 1, wherein the extracting of the conversation information for a response or the determining of the response policy comprises:
    analyzing whether the query is related to a job or an application domain using a conversation sentence refined by the natural language conversation preprocessing unit as an input and determining whether to respond in accordance with the application domain and an application system;
    selecting a response policy for a short-answer conversation when the query of an input conversation in the conversation sentence refined by the natural language conversation preprocessing unit is a query responded to with a short answer; and
    selecting a response policy for a conversation related to procedural knowledge when the input conversation or the query in the conversation sentence refined by the natural language conversation preprocessing unit is a conversation related to procedural knowledge.

3. The method of claim 2, wherein the procedural knowledge includes conditions and rules of actions that a user abides by when performing a duty.

4. The method of claim 1, wherein the outputting of the conversation context and the extracting of the response candidates related to the query of the conversation information comprises:
    analyzing conversation context in the conversation information input from the natural language conversation understanding unit;
    when the conversation information input from the natural language conversation understanding unit is a general query, detecting response candidates for the general query;
    when the conversation information input from the natural language conversation understanding unit is a short-answer conversation, detecting response candidates for the short-answer conversation on the basis of predefined queries or repeated queries; and
    determining whether the conversation information input from the natural language conversation understanding unit is a conversation related to procedural knowledge, and when the conversation information is a conversation related to the procedural knowledge, detecting response candidates for the conversation related to the procedural knowledge in accordance with a condition and an order.

5. The method of claim 4, wherein the detecting of the response candidate for the short-answer conversation comprises, when the conversation information input from the natural language conversation understanding unit is a short-answer conversation, analyzing similarities with the query sentence in query-answer pairs prepared in advance and determining a response to a query having a highest score in existing response knowledge as a response candidate.

6. The method of claim 4, wherein the detecting of the response candidates for the conversation related to the procedural knowledge comprises:
    when the procedural knowledge relates to a method, detecting knowledge about conditions preceding a job;
    when the procedural knowledge relates to an order, detecting knowledge about an order of performing the job;
    when the procedural knowledge is for training or before the job is started, detecting basic guideline knowledge; and
    while the job is performed, standardizing knowledge for providing checklist knowledge.

7. The method of claim 1, wherein the standardizing of the field situation for the collection of the situation information comprises:
    recognizing a job of a user using the user information and the job information and domain knowledge;
    generating a table template in which situation information input from a situation-aware platform is standardized in accordance with the job of the user; and
    recognizing which procedural knowledge corresponds to a procedural situation using the conversation context input from the assistant conversation management unit, the situation information, and the job information.

8. The method of claim 7, wherein the table template includes a model for estimating and recognizing a current stage of the situation and situation information analyzed by the model.

9. The method of claim 1, wherein the detecting of the refined responses comprises:

extracting response candidate qualifications to map the response candidates input from the assistant conversation management unit to the situation information input from the situation information collection unit;

recognizing a current order or state in procedural knowledge by considering job-related metainformation and situation information and context information together and generating a response-situation mapping result table by mapping the response candidates to the situation information; and detecting refined responses among the response candidates on the basis of response situation mapping results of the response situation mapping result table.

10. The method of claim 9, wherein the detecting of the refined responses comprises scoring the response candidates to detect the refined responses.

11. The method of claim 10, wherein the detecting of the refined responses comprises setting a higher score for a corresponding response when a current situation is mapped to a larger number of columns, and scoring the response candidates by giving a degree of importance to each column of the response-situation mapping result table.

12. The method of claim 11, wherein the detecting and transmitting of the final response to the portable device comprises selecting a response having a highest score among the refined responses as the final response.

* * * * *